US012746723B2

(12) United States Patent
Myllylä et al.

(10) Patent No.: US 12,746,723 B2
(45) Date of Patent: Sep. 29, 2026

(54) STEREOLITHOGRAPHY APPARATUS EQUIPPED FOR DETECTING AMOUNT OF RESIN, AND METHOD OF OPERATING SAME

(71) Applicant: PLANMECA OY, Helsinki (FI)

(72) Inventors: Tuomas Myllylä, Helsinki (FI); Tero Rakkolainen, Helsinki (FI); Ville Vuorio, Helsinki (FI); Jari Koponen, Helsinki (FI); Lasse Toimela, Helsinki (FI)

(73) Assignee: PLANMECA OY, Helsinki (FI)

( * ) Notice: Subject to any disclaimer, the term of this patent is extended or adjusted under 35 U.S.C. 154(b) by 810 days.

(21) Appl. No.: 17/256,409

(22) PCT Filed: Mar. 11, 2019

(86) PCT No.: PCT/FI2019/050195
§ 371 (c)(1),
(2) Date: Dec. 28, 2020

(87) PCT Pub. No.: WO2020/002755
PCT Pub. Date: Jan. 2, 2020

(65) Prior Publication Data

US 2021/0268743 A1 Sep. 2, 2021

(30) Foreign Application Priority Data

Jun. 28, 2018 (FI) ..................................... 20185591

(51) Int. Cl.
*B29C 64/393* (2017.01)
*B29C 64/135* (2017.01)
(Continued)

(52) U.S. Cl.
CPC .......... *B29C 64/393* (2017.08); *B29C 64/135* (2017.08); *B29C 64/255* (2017.08);
(Continued)

(58) Field of Classification Search
None
See application file for complete search history.

(56) References Cited

U.S. PATENT DOCUMENTS 5,258,146 A 11/1993 Almquist
2006/0192312 A1 8/2006 Wahlstrom
(Continued)

FOREIGN PATENT DOCUMENTS

EP 1478504 A 11/2004

OTHER PUBLICATIONS

International Search Report for PCT Application No. PCT/FI2019/050195, Mailed Jul. 1, 2019, 3 pages.

*Primary Examiner* — Christina A Johnson
(74) *Attorney, Agent, or Firm* — Lippes Mathias LLP

(57) ABSTRACT

A stereolithography apparatus comprises a fixed vat (401) or a holder for receiving a removable vat for holding resin for use in a stereolithographic 3D printing process, an optical radiator (901) configured to project a pattern upon a portion of said vat (401), an optical imaging detector *501 (field of view, installed and directed so that said portion of said vat (401) and/or a surface onto which the projected pattern is reflected—is within said field of view when said optical imaging detector (501) is in an operating position, and a controller (502, 2001) coupled to said optical imaging detector (501) for receiving optical image data from said optical imaging detector (501). Said controller (502, 2001) is configured to use said optical image data to calculate an amount of resin in said vat (401).

20 Claims, 7 Drawing Sheets

(51) Int. Cl.

| | |
|---|---|
| ***B29C 64/255*** | (2017.01) |
| ***B29C 64/268*** | (2017.01) |
| ***B33Y 10/00*** | (2015.01) |
| ***B33Y 30/00*** | (2015.01) |
| ***B33Y 50/02*** | (2015.01) |
| ***G06T 7/521*** | (2017.01) |
| ***G06T 7/73*** | (2017.01) |

(52) U.S. Cl.
CPC ............ *B29C 64/268* (2017.08); *B33Y 10/00* (2014.12); *B33Y 30/00* (2014.12); *B33Y 50/02* (2014.12); *G06T 7/521* (2017.01); *G06T 7/73* (2017.01)

(56) References Cited

U.S. PATENT DOCUMENTS

| | | | | |
|---|---|---|---|---|
| 2007/0268585 | A1* | 11/2007 | Santoro | F21S 11/00 359/599 |
| 2014/0084517 | A1* | 3/2014 | Sperry | B29C 64/245 264/494 |
| 2017/0057174 | A1 | 3/2017 | Megretski | |
| 2017/0326797 | A1* | 11/2017 | Alvarez | G03G 15/1625 |
| 2018/0065295 | A1* | 3/2018 | Alves | B29C 64/129 |
| 2018/0153205 | A1* | 6/2018 | Wu | B33Y 50/02 |
| 2018/0281284 | A1* | 10/2018 | Elgar | B29C 64/371 |

* cited by examiner

STEREOLITHOGRAPHY APPARATUS EQUIPPED FOR DETECTING AMOUNT OF RESIN, AND METHOD OF OPERATING SAME

FIELD OF THE INVENTION

The invention concerns the technology of stereolithographic 3D printing, also known as stereolithographic additive manufacturing. In particular the invention concerns the utilization of obtained image data in optimizing the use of resin in a stereolithography apparatus.

BACKGROUND OF THE INVENTION

Stereolithography is a 3D printing or additive manufacturing technique in which optical radiation is used to photopolymerize suitable raw material to produce the desired object. The raw material comes to the process in the form of a resin. A vat is used to hold an amount of resin, and a build platform is moved in the vertical direction so that the object to be produced grows layer by layer, beginning on a build surface of the build platform. The optical radiation used for photopolymerizing may come from above the vat, in which case the build platform moves downwards through the remaining resin as the manufacturing proceeds. The present description concerns in particular the so-called "bottom up" variant of stereolithography, in which the photopolymerizing optical radiation comes from below the vat and the build platform moves upwards away from the remaining resin as the manufacturing proceeds.

In general, making the operation of a stereolithography apparatus easy and straightforward for even inexperienced users involves several challenges. For example, different resins are needed for manufacturing different kinds of objects, and making full use of their properties may require setting the values of operating parameters of the stereolithography apparatus accordingly. The user may consider it tedious and inconvenient to carry the responsibility of programming the apparatus with the correct parameter values every time. The resins are relatively expensive, for which reason care should be taken to not allow too much resin to enter the vat and to utilize as much of the remaining resin as possible for actual manufacturing jobs. The viscous and sticky nature of resins calls for as automatized handling of resin as possible.

The prior art includes various solutions to measure the surface level of resin in the vat. Some of these include components getting in touch with the sticky resin material or apply technologies not appli-cable for use with any kind of vats, like ones made of aluminium.

OBJECTIVE OF THE INVENTION

In the light of these challenges, structural solutions and operating practices are needed that would make detecting the surface level or calculating the amount of resin in vat preferably simple and inex-pensive enough, yet also reliable enough.

SUMMARY

The invention is aimed to present a stereolithography apparatus and a method of operating it so that the user would consider its use convenient and safe.

These and other advantageous aims are achieved by equipping the stereolithography apparatus with an optical radiator and an optical imaging detector, the field of view of which covers at least part of the working region of the apparatus.

According to a first aspect, a stereolithography apparatus comprises a fixed vat or a holder for receiving a removable vat for holding resin for use in a stereolithographic 3D printing process, an optical radiator configured to project a pattern upon a portion of said fixed or removable vat, an optical imaging detector having a field of view, installed and directed so that said portion of said fixed or removable vat and/or a surface onto which the projected pattern is reflected is within said field of view when said optical imaging detector is in an operating position, and a controller coupled to said optical imaging detector for receiving optical image data from said optical imaging detector. Said controller is configured to use said optical image data to calculate an amount of resin in said fixed or removable vat.

In an embodiment of the stereolithography apparatus said optical radiator is a laser configured to project at least one distributed pattern of laser light upon said portion of said fixed or removable vat.

In an embodiment of the stereolithography apparatus said portion of said fixed or removable vat comprises a portion of a rim of said fixed or removable vat, and said laser is configured to project said at least one distributed pattern upon said rim so that it extends from an edge of said rim linearly towards a bottom of said fixed or removable vat.

In an embodiment of the stereolithography apparatus said laser is configured to project said at least one distributed pattern upon said rim so that it extends from a horizontal edge of said rim perpendicularly towards said bottom of said fixed or removable vat.

In an embodiment of the stereolithography apparatus said laser is configured to project said at least one distributed pattern upon said rim so that it extends from a horizontal edge of said rim obliquely towards said bottom of said fixed or removable vat.

In an embodiment of the stereolithography apparatus said optical radiator is configured to project at least two separate distributed patterns of laser light upon said fixed or removable vat.

In an embodiment of the stereolithography apparatus said laser comprises at least one laser source and at least one lens configured to distribute a linear laser beam produced by said laser source into a fan-like shape.

In an embodiment of the stereolithography apparatus said optical radiator is a laser configured to project at least one pattern upon a center portion of said fixed or removable vat.

In an embodiment of the stereolithography apparatus said optical radiator is configured to only emit optical radiation of wavelengths longer than or at most equal to a predefined cutoff wavelength that is longer than wavelengths used to photopolymerize resins in stereolithography.

In an embodiment of the stereolithography apparatus said controller is configured to recognize an image of a reflection of said projected pattern from said optical image data, and configured to calculate said amount of resin held in said vat from one or more detected dimensions of said image of said reflection.

According to a second aspect, a method of operating a stereolithography apparatus comprises optically projecting a pattern upon a portion of a fixed or removable vat of said stereolithography apparatus, generating a digital representation of an optical image of said portion of said fixed or removable vat and/or a surface onto which the projected pattern is reflected with said pattern projected or reflected upon it, and calculating an amount of resin in said fixed or removable vat using said digital representation.

In an embodiment of the method said pattern is a distributed pattern of laser light upon a portion of a rim of said fixed or removable vat.

In an embodiment of the method said distributed pattern comprises a line across a portion of said rim, and the method comprises detecting from said digital representation the length of a first part of said line that optically appears different than the rest of said line.

In an embodiment of the method said pattern is a pattern of laser light upon a center portion of the fixed or removable vat, and the method comprises detecting from said digital representation the location of a secondary reflection that optically appears at a different location depending on the surface level of resin in the fixed or removable vat.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
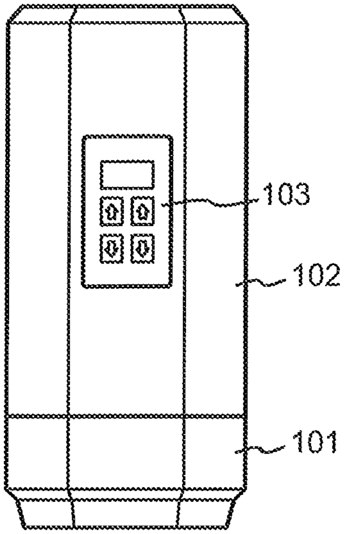
FIG. 1 illustrates a stereolithography apparatus in a front view with its lid closed.
Figure 2:
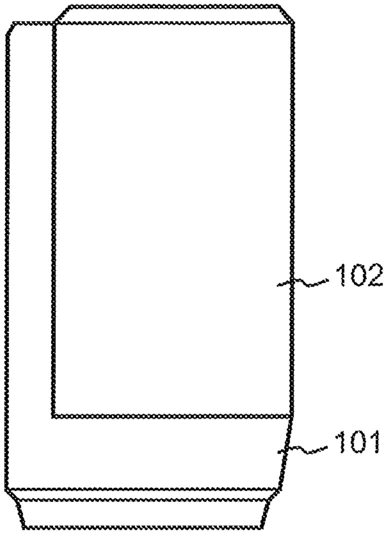
FIG. 2 illustrates a stereolithography apparatus in a side view with its lid closed.

FIGS. 1 to 4 illustrate an example of a stereolithography apparatus. The apparatus could also be called a stereolithographic 3D printer, or a stereolithographic additive manufacturing apparatus. Basic parts of the apparatus are a base part 101 and a lid 102, of which the lid 102 is movably coupled to the base part 101 so that it can move between a closed position shown in FIGS. 1 and 2 and an open position shown in FIGS. 3 and 4. Here the direction of the movement is vertical, but this is not a requirement; the movement of the lid 102 in relation to the base part 101 could take place in other directions. An important advantage of a movable lid of this kind is that an ongoing stereolithographic 3D printing process can be protected from any interfering external optical radiation by closing the lid 102.

A vat 401 is provided in the base part 101 for holding resin for use in the stereolithographic 3D printing process. If the vat 401 is not a fixed part of the stereolithography apparatus, the base part 101 may comprise a holder for receiving a removable vat.

The holder may be for example a table 405 having an essentially horizontal upper surface on which a vat 401 is placeable. Additionally or alternatively the holder may comprise support rails, alignment aids, locking mechanisms, and/or other comparable means configured to support a vat and/or to ensure that it assumes and remains in the appropriate location. In this description all references to the vat 401 are to be understood to cover both a fixed vat arrangement and an arrangement in which a removable vat 401 can be received in a holder of said kind.

A build platform 402 with a build surface 403 is supported above the vat 401 so that the build surface 403 faces the vat 401. This arrangement is typical to the so-called "bottom up" variant of stereolithography, in which the photopolymerizing radiation comes from below the vat. The bottom of the vat 401 is or can be selectively made transparent or translucent for the kind of radiation used for said photopolymerizing.

A moving mechanism is provided and configured to move the build platform 402 in a working movement range between first and second extreme positions. Of these, the first extreme position is the one proximal to the vat 401, and the second extreme position is the one distant from the vat 401. In the first extreme position the build surface 403 is very close to the bottom of the vat 401. The first layer of the object to be manufactured will be photopolymerized onto the build surface 403 when the build platform 402 is in the first extreme position. Consequently, in said first extreme position the distance between the build surface 403 and the bottom of the vat 401 is in the order of the thickness of one layer in the stereolithographic 3D printing process.

Figure 3:
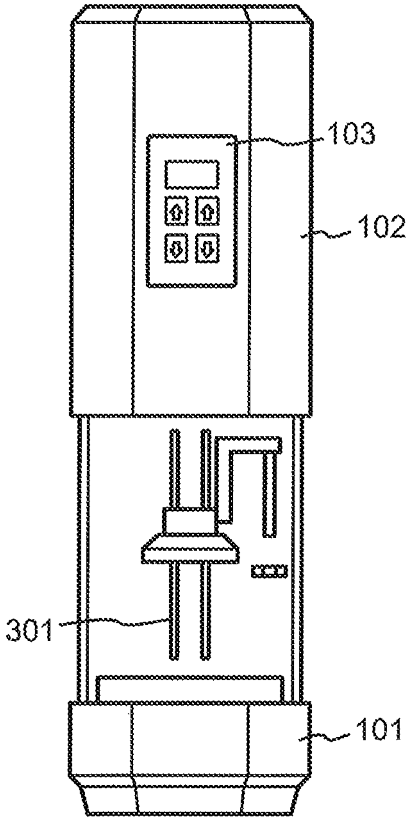
FIG. 3 illustrates a stereolithography apparatus in a front view with its lid open.
Figure 4:
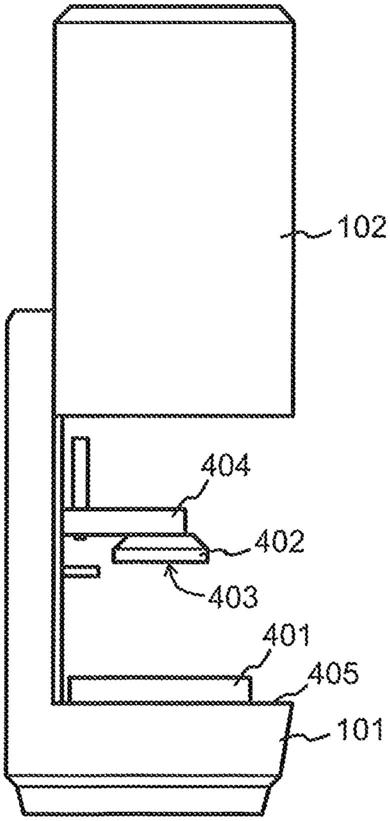
FIG. 4 illustrates a stereolithography apparatus in a side view with its lid open.

The position shown in FIGS. 3 and 4 may be the second extreme position, or at least closer to the second extreme position than to the first extreme position. A working region of the stereolithography apparatus may be said to exist between the vat 401 and the second extreme position of the build platform 402, because the object to be manufactured will appear within this region. The build platform 402 does not need to move up to or even close to the second extreme position during the manufacturing of an object; the second extreme position may be most useful for making it easier to detach a manufactured object from the build platform 402 once the object is complete.

In the embodiment of FIGS. 1 to 4 the moving mechanism for moving the build platform 402 is inside the base part 101, and only represented by the two slits 301 seen in a vertical surface of the base part 101, as well as the horizontal support 404 of the build platform 402. There is also a similarly hidden moving mechanism for moving the lid 102 with respect to the base part 101. This second moving mechanism may comprise parts inside the base part 101 and/or parts inside the lid 102. Enclosing essentially all moving mechanisms within the casings of the base part 101 and/or the lid 102 involves the advantage of added safety, because it makes it improbable that a user could get injured by any moving parts of such mechanisms.

The horizontal support 404 of the build platform 402 is shown only schematically in the drawings.

In a practical implementation a support of the build platform 402 may comprise various advanced technical features, like joints and/or fine tuning mechanisms for ensuring that the orientation of the build surface 403 is appropriate. However, such features are out of the scope of this description and are therefore omit-ted here.

Another feature of the exemplary stereolithography apparatus of FIGS. 1 to 4 is a user interface, which in this example comprises a touch-sensitive display 103 in the lid 102. The user interface may comprise various functions for implementing interactions between the apparatus and its user, in-cluding but not being limited to buttons for controlling the movements of the lid 102 and the build platform 402. A touch-sensitive display is an advantageous feature of a user interface in particular if the stereolithography apparatus is to be used in environments where thorough cleaning and disinfecting are regularly required, like at medical and/or dental clinics. Placing a touch-sensitive display 103 and/or other parts of the user interface in a front part of the lid 102 is advantageous, because it makes such parts of the user interface easily accessible to the user. As such, at least some parts of the user interface could be implemented in the base part 101. Yet another possibility is to implement at least a part of the user interface in a suitably programmed portable user device, like a tablet or smartphone, so that short-distance wired or wireless communications are set up between the stereolithography apparatus and the portable user device.

Significant advantage can be gained by providing the stereolithography apparatus with an optical imaging detector, installed and directed so that at least a part of the working region is within the field of view of the optical imaging detector. If the optical imaging detector is movable between at least one operating position and some other positions, the working region should appear within the field of view of the optical imaging detector at least when the optical imaging detector is in said operating position. An optical imaging detector is a device that is capable of producing optical image data indicative of what can be optically detected within its field of view. Most optical imaging detectors can be characterized as (digital) cameras, but there are e.g. optical imaging detectors working on other wavelengths than visible light, which may not necessarily be commonly referred to as cameras. In order to maintain general applica-bility the term optical imaging detector is used in this description.

Figure 5:
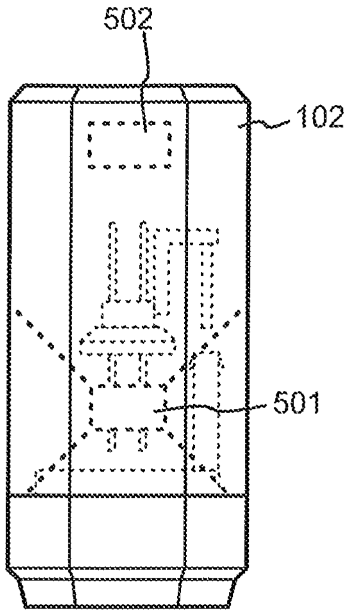
FIG. 5 illustrates an example of an operating position of an optical imaging detector in a front view.
Figure 6:
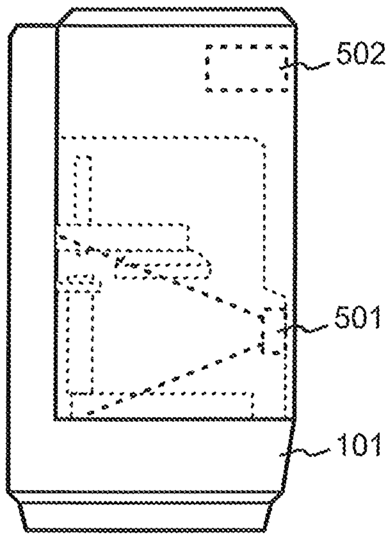
FIG. 6 illustrates an example of an operating position of an optical imaging detector in a side view.

FIGS. 5 and 6 illustrate schematically an example of how an optical imaging detector 501 may be installed on the inside of the lid 102. Closing the lid 102 brings the optical imaging detector 501 into an operating position, in which at least a part of the working region is within its field of view. This is illustrated also in FIG. 7, in which the lid is omit-ted for graphical clarity. The optical imaging detector 501 could be placed in some other part of the lid 102 than what is shown schematically in FIGS. 5 and 6. Placing the optical imaging detector 501 on the inside of the lid 102 involves also additional advantages, like the fact that its location is well protected and the possibility of making the optical imaging detector move with the lid along a well-defined trajectory. The latter is a useful characteristic in some possible uses of the optical imaging detector.

A yet further alternative way of supporting the optical imaging detector 501 would be to fix it to the base part 101, for example through a telescopic or foldable support arm so that a user could move it aside when not needed, or so that the stereolithography apparatus could automatically bring the optical imaging detector to the operating position only when needed. The optical imaging detector 501 could also be installed somewhere in the same vertical surface that has the slits 301 along which the support 404 moves the build platform 402.

The stereolithography apparatus shown in FIGS. 5 and 6 comprises a controller 502 coupled to the optical imaging detector 501 for receiving optical image data from the optical imaging detector 501. The controller 502 may be configured to use such optical image data in controlling operation of the stereolithography apparatus. Examples of such controlling are described in more detail later in this text. The coupling between the optical imaging detector 501 and the controller may be a wired coupling or a wireless coupling, or it may comprise both wired and wireless elements either as alternatives of each other or aug-menting each other.

The controller 502 is shown as installed in the lid 102 in FIGS. 5 and 6, but it could alternatively be installed in the base part 101. The controller functionality could even be distributed so that some parts of it could be implemented with circuits located in the lid 102 while other parts of the controller functionality could be implemented with circuits located in the base part 101. Placing the controller in the lid 102 may be advantageous if also a significant portion of the other electronics, like the user interface, is placed in the lid 102, because wiring may become simpler. The user interface is not shown in FIGS. 5 and 6 in order to enhance graphical clarity.

The controller 502 may be configured to execute a machine vision process to recognize objects from the optical image data it receives from the optical imaging detector 501. The optical image data is essentially a digital representation of an image rec-orded by the optical imaging detector 501, and machine vision in general means extracting information from an image. Thus by executing a machine vision process the controller 502 is capable of extracting information that enables recognizing various objects seen by the optical imaging detector 501. The controller 502 may be configured to make decisions based on such recognized objects.

One example of an object that the controller 502 may recognize is a resin tank, or a piece of graphically represented information carried by a resin tank. In order to provide some background for this kind of applications, the task of resin handling is described in some more detail in the following.

Figure 7:
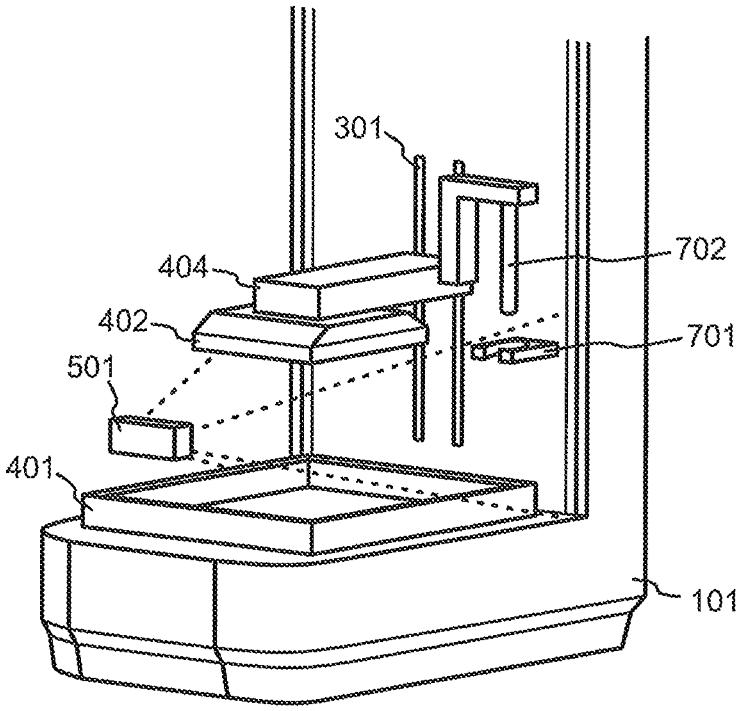
FIG. 7 illustrates an example of a working region of a stereolithography apparatus.

The resin that is to be used in the stereolithographic 3D printing process may be brought to the stereolithography apparatus in a resin tank. The des-ignation “resin tank” is used in this text as a general descriptor of any kinds of containers that may hold resin in readiness for the resin to be used in a stereolithographic 3D printing process. The stereolithography apparatus may comprise a holder for removably receiving a resin tank to an operating position in the stereolithography apparatus. An example of such a holder is illustrated in FIG. 7 with the reference designator 701. Providing a holder for removably receiving a resin tank involves the advantage that the user may easily exchange resin tanks to ensure the use of the most optimal resin for each stereolithographic 3D printing job.

A resin tank that can be removably received in the holder 701 may have the form of an elongated capsule, preferably with a cover or plug covering an opening in one end, and with an outlet appearing in the other end. The outlet may be equipped with a valve, seal, plug, or some other means that keep the resin from escaping the resin tank unless explicitly desired. Such an elongated, capsule-formed resin tank can be removably received in the holder 701 so that the end with the opening is upwards, and the outlet is in or close to the vat 401 or close to a channel through which resin may flow to the vat 401.

In the example embodiment of FIG. 7 a piston 702 is attached to the same support 404 as the build platform 402. When the build platform 402 moves downwards in order to assume the first extreme position, which is the starting position for producing a new object, the piston 702 moves downwards in concert with the build platform 402. This movement of the piston 702 pumps the resin out of the resin tank that was received in the holder 701, so that the resin flows out of the outlet and into the vat 401. The cover or plug that covered the opening in the upper end of the resin tank must naturally have been removed before that, as well as the means that closed the outlet, unless some mechanism is provided that automatically opens the opening and/or the outlet when needed.

It must be noted that making the piston 702 move in concert with the build platform 402 is only an example implementation. It involves the advantage that only one moving mechanism is needed to move two parts. However, in some applications it may be desirable to be able to control the delivery of resin into the vat 401 independently of the movement of the build platform 402. For such applications an embodiment can be presented in which there are separate mechanisms for moving the build platform 402 and for delivering resin from a resin tank to the vat 401. Such a separate mechanism may involve for example a piston that is otherwise like the piston 702 in FIG. 7 but supported and moved by a moving mechanism of its own.

Only one holder 701 for one resin tank is shown in the drawings, but the stereolithography apparatus may comprise two or more holders, and/or a single holder may be configured to receive two or more resin tanks. In particular if there are separate mechanisms for pumping resin from different resin tanks to the vat 401, the provision of places for receiving multiple resin tanks involves the advantage that different resins can be used automatically, even during the manufacturing of a single object. Such a feature may be useful for example if the object to be manufactured should exhibit a sliding change of color. The stereolithography apparatus might comprise two tanks of differently pigmented resin, and these could be de-livered to the vat in selected proportions so that the resulting mix of resins in the vat would change its color accordingly.

Figure 8:
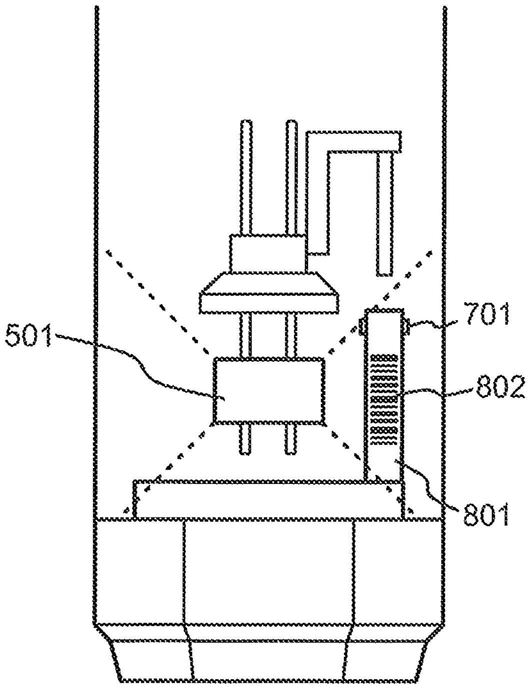
FIG. 8 illustrates an example of using graphically represented information on a visible surface of a resin tank.

FIG. 8 illustrates schematically a case in which a resin tank 801 has been received in the holder 701. A visible surface (visible in the field of view of the optical imaging detector 501) of the resin tank 801 is provided with a piece 802 of graphically represented information. In the example of FIG. 8 a barcode is used, but any other form of graphically represented information could be used, like a QR code or a color or color combination of the resin tank 801 or a part of it. The use of graphically represented information involves the advantage that it can be read with an optical imaging detector, for which there may be also other advantageous uses in the stereolithography apparatus.

The information carried by the piece 802 of graphically represented information is or reveals ad-vantageously something that is pertinent to just that resin that is contained in that particular resin tank 801. Additionally or alternatively the information carried by the piece 802 of graphically represented information may be or reveal something that is pertinent to that particular resin tank itself. Said information may contain for example one or more of the following: an identifier of resin contained in the resin tank 801, an indicator of amount of resin contained in the resin tank 801, a manufacturing date of resin contained in the resin tank 801, a best before date of resin contained in the resin tank 801, unique identifier of the resin tank 801, a digital signature of a provider of resin contained in the resin tank 801.

As an interesting special case, the information carried by the piece 802 of graphically represented information may contain a piece of parameter data. The controller 502, on the other hand, may be configured to use such a piece of parameter data as a value of an operating parameter of the stereolithography apparatus. An operating parameter is a specific measurable quantity, the value of which has a direct effect on how the stereolithograpic 3D printing proceeds. Examples of such operating parameters include but are not limited to the following: a preheating temperature of resin, a layer exposure time, a layer thickness, a moving speed of a build platform, or awaiting time between two successive method steps in stereolithographic 3D printing.

The concept of using a removably attachable resin tank to convey a value of an operating parameter to the stereolithography apparatus can be generalized to cover other than graphically represented information. Examples of such other ways include but are not limited to using various kinds of memory circuits attached to and/or embedded in the material of such a resin tank. In a general case the resin tank comprises a machine-readable identifier of the resin tank, and the stereolithography apparatus comprises a reader device configured to read in parameter data from a machine-readable identifier of a resin tank. The reader device may comprise contact members in the holder 701 so that receiving a resin tank in the holder simulta-neously connects the reader device to said machine-readable identifier. Alternatively the reader device may be a wirelessly reading reader device configured to perform said reading of parameter data without direct physical contact between said reader device and said resin tank. Examples of such wirelessly reading reader devices are radio transceivers (using e.g. NFC, Bluetooth, or other short-distance radio transmission technology) and optical imaging detectors. The reader device may comprise multiple contact-based and/or wireless technologies for accommodating different kinds of machine-readable identifiers in resin tanks.

Further in said general case the stereolithography apparatus comprises a controller coupled to the reader device and configured to receive parameter data read in by said reader device. Said controller may be configured to use at least a piece of said received parameter data as a value of an operating parameter of said stereolithography apparatus.

This way of conveying values of operating parameters involves for example the advantage that new kinds of resins may be brought into use, without the need to preprogram an automatically operating stereolithography apparatus for their most appropriate handling. In comparison, we might consider a case in which the piece 802 of graphically represented information contained just a specific identifier of the kind of resin contained in the resin tank. In such a case the controller 502 should have access to a library of previously stored parameter data, so that af-ter having recognized the particular resin, it could read the corresponding most appropriate values for operating parameters from the library and take them into use. Conveying one or more values of parameter data in the piece 802 of graphically represented information enables more flexible operation, because such a library is not needed at all or because only a limited library of parameter values is needed for those cases in which not all parameter values can be read from the piece 802 of graphically represented information.

As such, it is not excluded that the stereolithography apparatus might have access to an external database of parameter data and other information concerning resins and resin tanks. For example, if a fa-cility has two or more stereolithographic apparatuses in which at least some of the same resin tanks may be used in turns, it may be advantageous to have a shared database that contains information about the resin tanks and the resins they contain. In such a case the controller 502 could respond to receiving image data in which a graphical identifier of a resin tank is found by accessing the database in order to obtain information about the resin or resin tank and/or to up-date the database with information concerning what the stereolithography apparatus currently does with that resin or resin tank.

Irrespective of whether the reader device is contact-based or wirelessly reading, the reader device may be configured to perform the reading in of parameter data when the resin tank is in an operating position in a holder. In the case of using an optical imaging detector as the reader device this may mean that the optical imaging detector is directed so that a resin tank, which was removably received to the holder, is within a field of view of the optical imaging detector.

If the reader device comprises an optical imaging detector, the previously mentioned machine vision process may be utilized so that the controller, which is coupled to the optical imaging detector for receiving optical image data from the optical imaging detector, is configured to execute said machine vision process to recognize a piece of graphically represented information carried by a resin tank that was received in the holder. The controller may be configured to extract parameter data from said recognized piece of graphically represented information, and to use at least a piece of said extracted parameter data as a value of an operating parameter of said stereolithography apparatus.

Additionally or alternatively the controller may be configured to generate an alert and/or to interrupt any stereolithographic 3D printing process and/or prevent beginning any stereolithographic 3D printing process in response to finding that at least one piece of said extracted parameter data triggers some alerting criterion. For example, if the piece of graphically represented information carried by the resin tank contains a best before date of the resin and the controller notices that the date has passed already, it may alert the user so that the user may then decide, whether the resin can still be used or whether a tank of fresh resin should be installed instead. As another example, if the piece of graphically represented information carried by the resin tank indicates that the tank contains a certain amount of resin, and the controller has calculated that more than such an amount will be needed, it may alert the user so that the user may consider, whether a larger resin tank should be installed. As yet another example, if the piece of graphically represented information carried by the resin tank conveys an operating parameter value that cannot be realized, the controller may alert the user so that the user may consider, whether to change to another resin.

In order to ensure that the user will always attach the resin tank 801 in the right way, so that the piece 802 of graphically represented information is visible to the optical imaging detector 501, the holder 701 may comprise a mechanical key for forcing the resin tank 801 to be received to the stereolithography apparatus in a predetermined orientation. The resin tank 801 should then comprise a reciprocal slot for such a mechanical key, for forcing said resin tank to be attached to the stereolithography apparatus in the predetermined orientation. The roles of a mechanical key and reciprocal slot could be exchanged, so that the resin tank comprises a mechanical key and the holder comprises a reciprocal slot. Here the terms mechanical key and reciprocal slot are used in a general sense, meaning any kinds of mutually engaging mechanical designs in the holder 701 and the resin tank 801 that serve the purpose of guiding a user to attach the resin tank to the stereolithography apparatus in the predetermined orientation. There may be one, two, or more pairs of mechanical keys and reciprocal slots used for this purpose.

The use of an optical imaging detector as a reader device involves the particular advantage that the same optical imaging detector can be used also for other purposes in the stereolithography apparatus. Such other purposes may even substantiate the provision of an optical imaging detector even if it is not used for reading graphically represented information from resin tanks. Some of such advantageous other purposes are described in the following.

Figure 9:
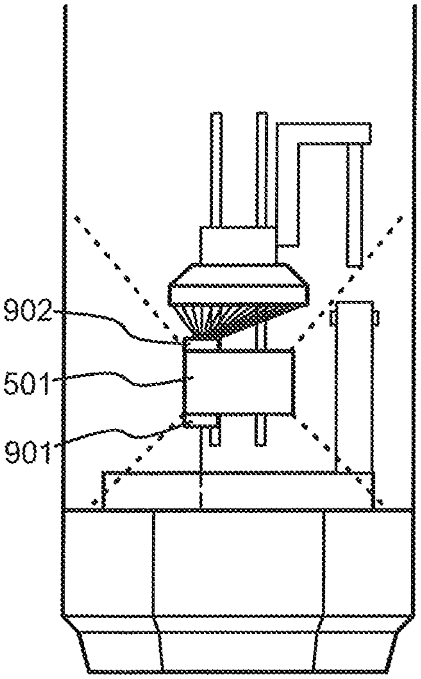
FIG. 9 illustrates an example of using optical radiators in a front view.
Figure 10:
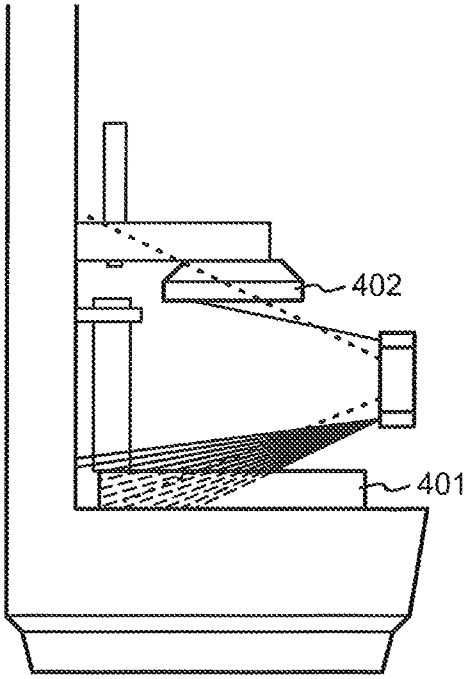
FIG. 10 illustrates an example of using optical radiators in a side view.

FIGS. 9 and 10 illustrate schematically apart of a stereolithography apparatus that comprises a first optical radiator 901 and a second optical radiator 902. In the drawings the optical radiators 901 and 902 are shown as being located in a common optical module with the optical imaging detector 501, but this is only an example, and any or both of them could be placed elsewhere in the stereolithography apparatus. It is possible that the stereolithography apparatus only comprises one of the first 901 and second 902 optical radiators, or none of them if the optical imaging detector 501 is used only for other purposes. It is also possible that the stereolithography apparatus comprises more than two optical radiators.

The first optical radiator 901 is configured to project a pattern upon a portion of the vat 401. In other words, at least some of the optical radiation emitted by the first optical radiator 901 hits some portion of the vat 401. If the vat 401 is removable, this applies when a vat 401 has been placed into its intended location within the stereolithography apparatus.

The affected portion of the vat 401 may be within the field of view of the optical imaging detector 501 when said optical imaging detector 501 is in its operating position (i.e. when the lid of the stereolithography apparatus, on the inside of which the optical imaging detector 501 is installed, is in its closed position). As was pointed out earlier, the optical imaging detector 501 does not need to be installed in the lid of the stereolithography apparatus, but it could be installed elsewhere. For the purpose described here it is only required that the optical imaging detector is installed and directed so that said portion of said vat, onto which the first optical radiator 901 projects a pattern, is within the field of view when said optical imaging detector is in an operating position.

Additionally or alternatively there may be a surface onto which the projected pattern is reflected from one or more reflective surfaces on its way. The surface onto which the projected pattern is reflected may mean a surface that is part of the vat 401, and/or some other surface in the stereolithography apparatus. Such a surface may be within the field of view of the optical imaging detector 501 when the optical imaging detector 501 is in its operating position. Said one or more reflective surfaces may comprise one or more surfaces belonging the vat 401, and/or a reflective surface of resin in the vat 401.

The controller of the stereolithography apparatus is not shown in FIGS. 9 and 10, but one is assumed to exist and to be coupled to the optical imaging detector 501 for receiving optical image data. The controller is configured to use said optical image data to calculate an amount of resin in the vat 401.

The principle of using optical image data for calculating how much resin there is in the vat 401 is based on the fact that the optical radiation emitted by the first optical radiator 901 reflects differently depending on how much resin, if any, there is in the vat. To this end the first optical radiator 901 should project the pattern to such portion of the vat 401 that is covered differently by resin depending on how much resin there is in the vat. It also helps if the projected pattern is as sharp by outline as possible. In order to achieve the last-mentioned objective it is advantageous if the first optical radiator 901 is a laser, configured to project at least one pattern of laser light upon said portion of the vat 401. The pattern may be a single spot or a distributed pattern like a number of single spots, a line, or an illumi-nated two-dimensional area.

A distributed pattern could be called also a spatially distributed pattern. It means a pattern that consists of more than just a single spot (which would be produced by a single laser beam as such). Distributed patterns of laser light can be produced for example by physically turning the laser source, and/or by using at least one laser source and at least one lens configured to distribute a linear laser beam produced by said laser source into a shape, like a fan-like shape or conical shape for example. A fan-like shape is considered in FIGS. 9 and 10 as an example: in FIG. 9 the view is in the plane of the fan, for which reason the fan-like shape of distributed laser light is seen as a single line. In FIG. 10 the view is perpen-dicular to the plane of the fan, so that the fan-like shape is clearly seen.

Figure 13:
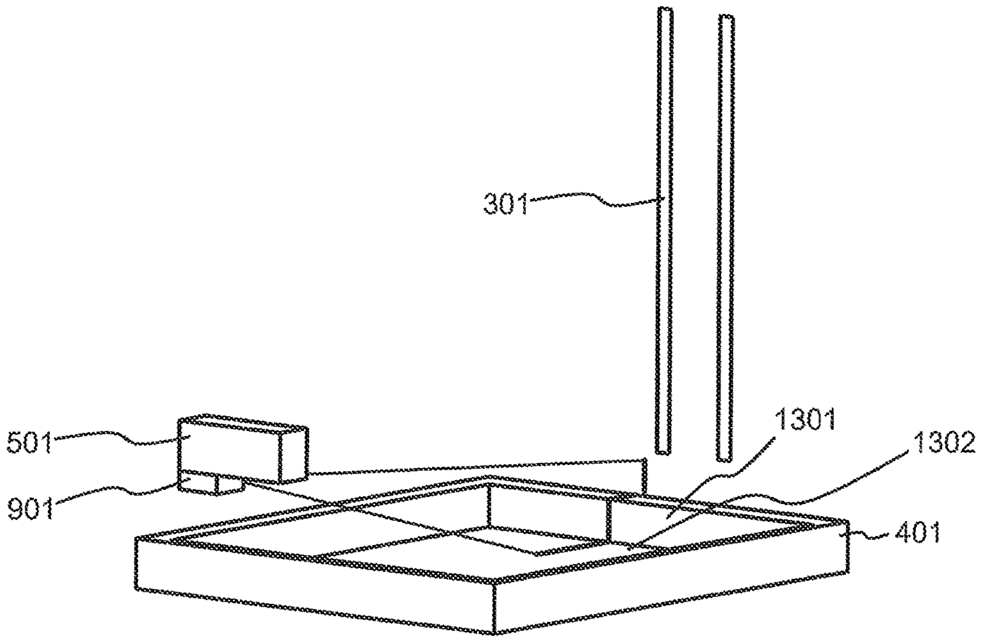
FIG. 13 illustrates an example of using an optical radiator to project a pattern upon a vat.

FIG. 13 is a simplified axonometric drawing of a vat 401, an optical imaging detector 501, and a first optical radiator 901, with the slits 301 seen in the background as a reminder of how said parts are located in the stereolithography apparatus. There is no resin in the vat 401 in FIG. 13. The portion of the vat 401, onto which the first optical radiator 901 projects its pattern, comprises a portion of a rim 1301 of the vat 401. The first optical radiator 901 is configured to project a distributed pattern upon the rim 1301 so that a reflection of the projected pattern extends from an edge of said rim 103 linearly towards a bottom 1302 of the vat 401.

Figure 14:
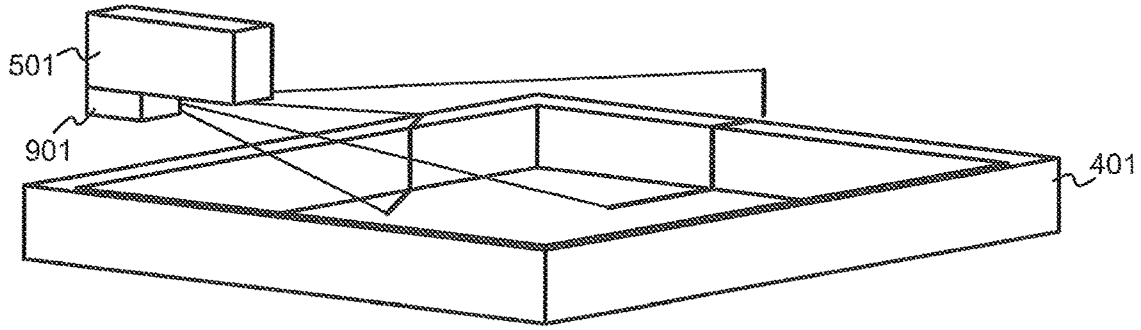
FIG. 14 illustrates an example of using an optical radiator to project a pattern upon a vat.

FIG. 14 shows an example of how the first optical radiator 501 may project more than one pattern onto more than one portion of the vat 401. In FIG. 14 the first optical radiator 901 is configured to project at least two separate distributed patterns of laser light upon said rim: there are two laser beams, each distributed into a fan-like shape, so that the reflection of each distributed pattern extends from an edge of the rim linearly towards a bottom of the vat 401.

Figure 15:
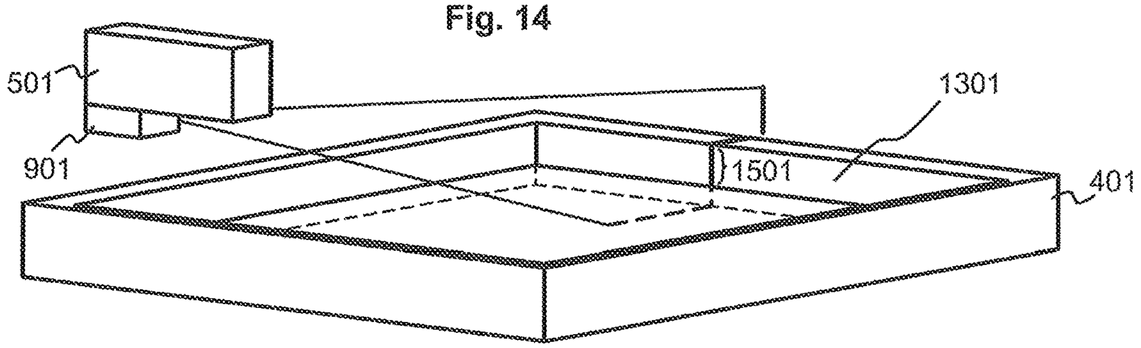
FIG. 15 illustrates an example of using an optical radiator to measure the amount of resin in a vat.

In FIG. 15 the situation is otherwise the same as in FIG. 13, but there is some resin in the vat 401. Here it is assumed that resin absorbs relatively effectively the laser light emitted by the first optical radiator 901, while the material of the vat 401 is a relatively good reflector so that a very clear and sharp reflection appears on its surface. The length of the linear reflection 1501 tells, how much of the rim 1301 is dry (i.e. not wetted by resin). When the dimensions of the vat 401 are known, measuring the length of the linear reflection 1501 is enough to calculate the amount of resin in the vat 401. In general it can be said that the controller, which is coupled to the optical imaging detector 501 to receive optical image data, is configured to recognize a reflection of said projected pattern from said optical image data, and configured to calculate the amount of resin held in the vat 401 from one or more detected dimensions of said reflection of said projected pattern.

The controller of the stereolithography apparatus may be configured to execute a machine vision process to implement the steps listed above. The controller could first find and select at least one image taken by the optical imaging detector 501 in which an observed reflection of a projected pattern appears upon the affected part of the vat 401 and/or the affected other surface. In said at least one image the controller could examine the coordinates, within the coordinate system of the image frame, of those pixels that contribute to the observed reflection of the pattern. The controller could find the coordinates of those pixels that appear to represent the extremities of the observed reflection, and calculate the difference between these coordinates. Mapping the calculated difference against a look-up table of possible calculated differences, or executing some other form of a decision-making algorithm, may give the measured amount of resin in the vat as a result.

Figure 16:
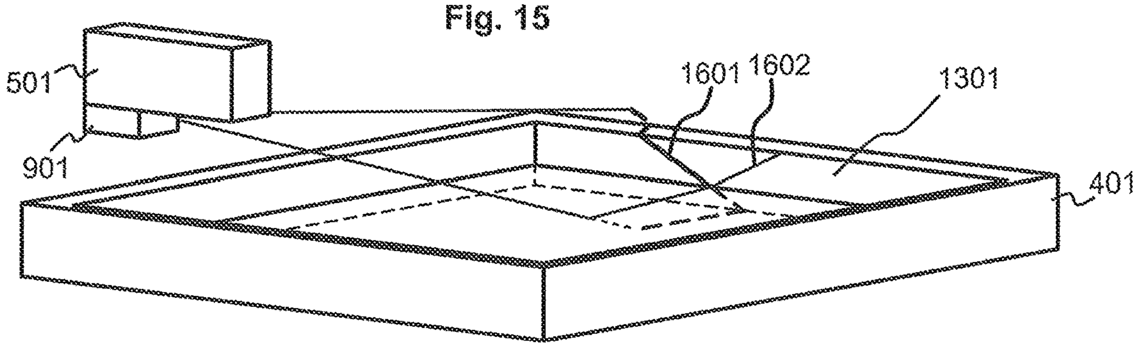
FIG. 16 illustrates an example of using an optical radiator to measure the amount of resin in a vat.

A common feature in FIGS. 13 to 15 is that the laser in the first optical radiator 901 is configured to project the at least one distributed pattern upon the rim so that the reflection extends from a horizontal edge of said rim perpendicularly towards a bottom of the vat. In other words, the linear reflection 1501 is a vertical line on the rim 1301 of the vat 401. This is not the only possibility. FIG. 16 illustrates schematically an alternative embodiment, in which the laser is configured to project said at least one distributed pattern upon said rim so that it extends from a horizontal edge of said rim obliquely towards a bottom of said vat. In other words, in FIG. 16 the linear reflection 1601 on the rim 1301 is obliquely directed.

A geometry like that in FIG. 16 offers a number of advantages, because the optical image data produced by the optical imaging detector 501 contains more features to be analyzed than in the case of FIG. 15. Changes in the level of the resin in the vat cause larger changes in the linear reflection 1601 of the fan-shaped laser beam on the surface of the rim 1301 than in FIG. 15. This may make it easier to detect even smaller changes in the amount of resin in the vat 401. Also, if the surface of the resin is smooth and reflective enough, one may observe a secondary reflection 1602 on the surface of the rim 1301, so that the corner point between reflections 1601 and 1602 indicates quite accurately the level of the resin surface in the vat 401. If the machine vision process recog-nizes such a corner point, it may give quite accurate results in calculating the amount of resin in the vat 401.

Figure 17:
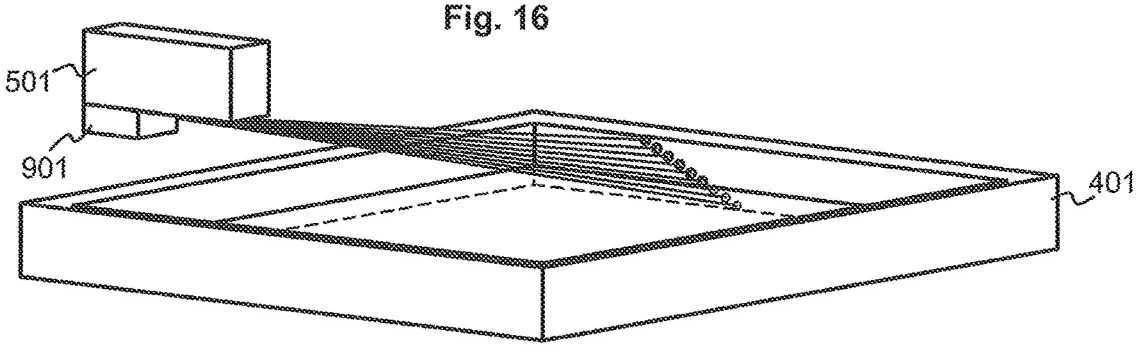
FIG. 17 illustrates an example of using an optical radiator to measure the amount of resin in a vat.

FIG. 17 illustrates yet another alternative embodiment, in which the distributedpattern is not continuous but consists of distinct spots. Even if the spots are arranged in a linear form in FIG. 17, this is not a requirement, but the pattern may be of any shape that makes it possible to calculate, by observing how the reflection differs from one obtained from a completely empty vat, and by knowing the dimensions of the vat, the amount of resin currently in the vat.

Figure 18:
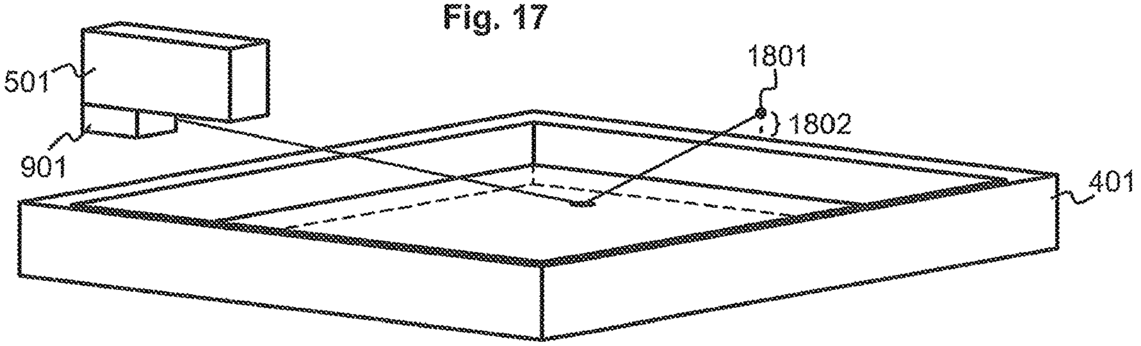
FIG. 18 illustrates an example of using an optical radiator to measure the amount of resin in a vat.

FIG. 18 illustrates yet another alternative embodiment. Here the first optical radiator 901 is configured to project a spot-like pattern upon a center portion of the vat 401, where the pattern is reflected from the top surface of resin if there is any in the vat 401. A secondary reflection 1801 appears on the vertical surface that is behind the vat 401 in the stereolithography apparatus. The height 1802 at which the secondary reflection 1801 appears depends on the surface level of the resin in the vat 401. The controller may find and select at least one image taken by the optical imaging detector 501 in which an observed secondary reflection 1801 of the projected spot-like pattern appears upon the affected surface. In said at least one image the controller could examine the coordinates, within the coordinate system of the image frame, of those pixels that contribute to the observed secondary reflection. As the secondary reflection is spot-like, the controller could find the average height coordinate of those pixels contribute to the observed reflection. This is an example of the detected dimension of the image of the reflection from which the amount of resin can be calculated in this embodiment. Mapping the average height against a look-up table of possible heights, or executing some other form of a decision-making algorithm, may give the measured amount of resin in the vat 401 as a result.

In all embodiments that are described here as determining the amount of resin in the (fixed or removable) vat it may be noted that actually the detected quantity is the surface level of resin in the vat and not (at least not directly) the current volume of resin in the vat. As it depends on the programming of the controller how the detected quantity is utilized, for the purposes of this text all references to calculating or determining the amount of resin can be considered synonymous and sufficiently equal in meaning with detecting the surface level of resin.

Enabling the stereolithography apparatus to automatically detect the surface level of resin in the vat involves a number of advantages. As an example, before pumping more resin into the vat the apparatus may check, how much resin (if any) is there already.

Since the resins may be relatively expensive, and since it may be cumbersome to draw any resin back into any kind of tank or other long-term repository, it is advisable to always use up all resin that was already pumped into the vat. This is more or less synonymous to only delivering as much new resin, to augment any already present in the vat, as is needed to complete the next known task of stereolithographic 3D printing. For a piece of control software that receives instructions to manufacture a particular three-dimensional object it is relatively straightforward to calculate the volume of the object to be manufactured. The calculated volume is then the same as the amount of resin that will be needed to actually manufacture the object.

Taken that stereolithography is based on photopolymerizing only some strictly delimited portions of resin, care should be taken not to use such optical radiators for other purposes (like measuring the amount of unused resin in the vat) that could cause unintended photopolymerization. Therefore it is advisable to select the first optical radiator 901 so that it is configured to only emit optical radiation of wavelengths longer than or at most equal to a predefined cutoff wavelength. Said cutoff wavelength should be selected longer than wavelengths used to photopolymerize resins in stereolithography. Ultraviolet radiation is often used for photopolymerizing, so said cutoff wavelength could be in the range of visible light. Laser light is monochromatic, so if a laser source is used in the first optical radiator 901, the wavelength of the laser light is synonymous to said cutoff wavelength. Naturally the wavelength of the first optical radiator 901 must be selected so that its reflection is easily detectable by the optical imaging detector 501.

Figure 11:
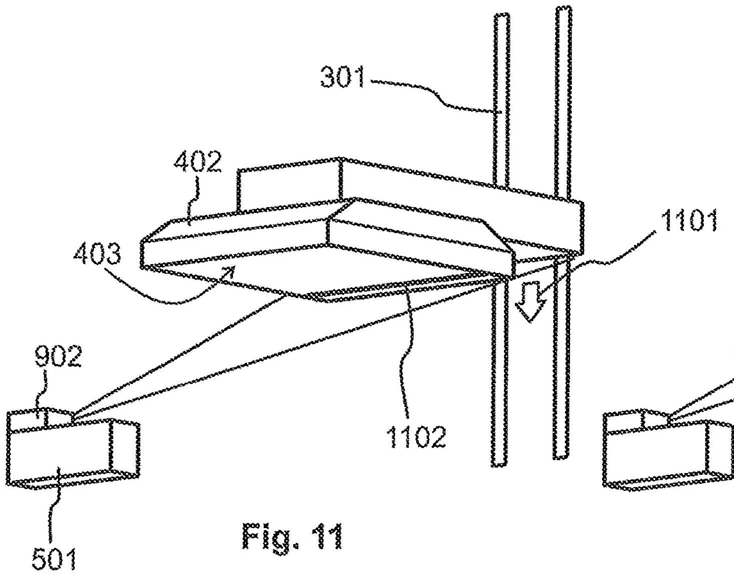
FIG. 11 illustrates an example of using an optical radiator to examine a build surface.
Figure 12:
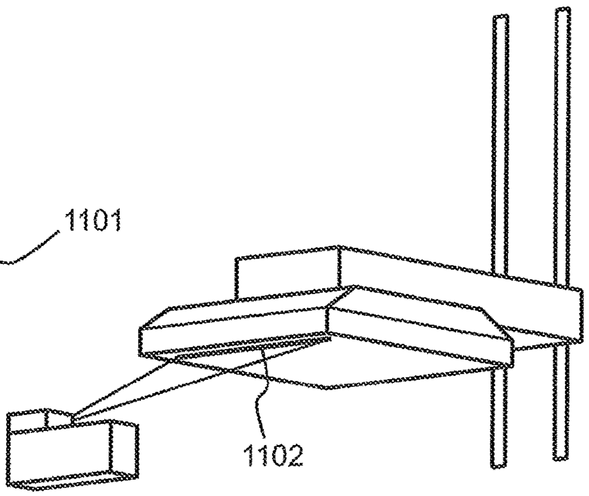
FIG. 12 illustrates an example of using an optical radiator to examine a build surface.

Another purpose for which an optical imaging detector 501—together with a second optical radiator 902—can be used in a stereolithography apparatus is shown in FIGS. 11 and 12. To provide some background, it may be noted that the build surface 403 of the build platform 402 will come very close to the bottom of the vat in the beginning of a stereolithographic 3D printing job. To this end, the build surface 403 should be appropriately directed, and clean of any pieces of any solid substance, before the build platform 402 is lowered into the starting position, which is the first extreme position mentioned earlier. Un-fortunately it may happen that the user has forgotten to detach the previously manufactured object from the build surface 403. Even if the user has detached the actual object that was manufactured previously, it may happen that some solid parts remain on the build surface 403. These may be for example support strands or bridges or base layers that had to be produced as apart of the previous 3D printing job for providing mechanical stability, even if they did not form part of the actual object to be manufactured.

Moving the build platform into the first extreme position with anything solid attached to the build surface may have serious consequences, like breaking the bottom of the vat or damaging the moving mechanism and/or support structure of the build platform. One possible protective measure might be monitoring the load experienced by the moving mechanism when the build platform is moved towards the first extreme position and stopping the movement if the load seems to increase. However, observing an increasing load in the moving mechanism means that contact was made already between the undesired solid remnants on the build surface and the bottom of the vat, so it may be too late already.

FIGS. 9 to 12 illustrate a principle of using a (second) optical radiator 902 and the optical imaging detector 501 to set up protective measures that help to prevent any accidental moving of the build platform 402 too close to the bottom of the vat 401 if there are any unwanted solid remnants on the build surface 403. Said principle is based on using the second optical radiator 902 to project a pattern onto the build surface 403 while it is in the field of view of the optical imaging detector 501, and examining a reflection of said pattern to determine, whether the observed form of the reflection indicates that there could be anything else than just the planar surface there that should be.

From the previous description it may be re-called that the stereolithography apparatus comprises a moving mechanism configured to move the build platform 402 in a working movement range between first and second extreme positions. The second optical radiator 902 is configured to project a pattern upon the build surface 403 when the build platform 4302 is in at least one predetermined position between said first and second extreme positions. The optical imaging detector 501 is installed and directed so that a reflection of said projected pattern is within its field of view when the build platform 402 is at said predetermined position. A controller of the stereolithography apparatus is coupled to the optical imaging detector 501 for receiving optical image data from the optical imaging detector 501. The controller is also configured to use said optical image data to examine the build surface 403 for exceptions from a default form of the build surface.

In order to be sure that no part of the build surface 403 contains any unwanted solid remnants, it would be advantageous to cover the whole build surface 403 with the projected pattern. This can be done for example by using a laser source and a lens that dis-tributes the laser beam into a regular two-dimensional matrix of dots close to each other. A machine vision algorithm could then analyze the image taken by the optical imaging detector 501 to tell, whether there is any irregularity in the array of dots seen in the image.

A slightly different approach is taken in the embodiment of FIGS. 9 to 12. The second optical radiator 902 is configured to project said pattern upon an affected part of the build surface 403, and this affected part changes position across the build surface 403 when the build platform 402 moves through a range of positions on its way between the first and second extreme positions according to arrow 1101 in FIG. 11.

Said range of positions does not need to oc-cupy the whole range between the first and second extreme positions, but preferably only a small sub-range thereof. However, throughout this range of positions the optical imaging detector 501 should see at least that part of the build surface 403 where a reflection of the projected pattern appears. In other words, each position within said range of positions must be a predetermined position as described above, i.e. one at which a reflection of the pattern projected by the second optical radiator 902 upon the build surface 403 is within the field of view of the optical imaging detector 501.

In this embodiment the way in which the second optical radiator 902 emits optical radiation may stay the same while the build platform 402 moves through said range of positions. Said movement makes the emitted optical radiation hit different parts of the build surface 403 at each position of said range of positions, so that in the end the emitted optical radiation has hit essentially all parts of the build surface 403 in turn. Knowing the form of the reflection that the emitted optical radiation should produce on a completely flat (or otherwise well known) form of a build surface 403, if any exceptions from such an expected form are observed by the optical imaging detector 501, it means that there is something on the build surface 403 that shouldn't be there.

In the embodiment illustrated in FIGS. 9 to 12 the second optical radiator 902 is a laser configured to project at least one distributed pattern of laser light upon the affected part of the build surface 403. If the same relatively simple approach is used as with the embodiment of the first optical radiator 901 explained earlier, the laser in the second optical radiator 902 may comprise at least one laser source and at least one lens configured to distribute a linear laser beam produced by said laser source into a fan-like shape. The reflection that is consequently produced on the build surface 403 is a straight line 1102 that crosses the build surface 403 at a position that depends on the height at which the build platform 402 is.

The controller of the stereolithography apparatus may be configured to execute a machine vision process to decide, whether the optical image data received from the optical imaging detector 501 indicates exceptions from a default form of the build surface 403. In the embodiment described above, in which the build surface 403 is flat and the second optical radiator 902 produces a fan-shaped laser beam, the controller could first find and select all images taken by the optical imaging detector 501 in which an observed reflection of the fan-shaped laser beam appears on the build surface 403. In each of these selected images the controller could examine the coordinates, within the coordinate system of the image frame, of those pixels that contribute to the observed reflection of the fan-shaped laser beam. The controller could fit a straight line to the coordinates of these pixels, and calculate one or more statistical descriptors that tell, how well the coordinates of said pixels obey the equation of such a fitted straight line. If any of these statistical descriptors is larger than some predetermined threshold value, the controller could decide that an exception from a default form of the build surface 403 was found.

In place of (or in addition to) the observed reflection of the projected pattern on the build surface, a secondary reflection on some other surface can be used. If the build surface is clean, it may produce a regularly formed secondary reflection on e.g. the vertical surface of the body part that is next to the build platform during its movement. Any remaining solidified resin on the build surface may cause distor-tions to the secondary reflection, which can be detected in a way similar to that explained above in association with the (primary) reflection on the build surface.

In general, the controller may be configured to either allow the operation of the stereolithography apparatus to continue as a response to finding no exceptions from said default form of said build surface, or interrupt operation of the stereolithography apparatus as a response to finding exceptions from said default form of said build surface. Interrupting the operation may be accompanied by giving an alert to a user of the apparatus through a user interface, prompting the user to check the build surface and re-move any remnants of solidified resin.

Taken that stereolithography is based on photopolymerizing only some strictly delimited portions of resin, care should be taken not to use such optical radiators for other purposes (like examining the build surface for exceptions from its default form) that could cause unintended photopolymerization. Therefore it is advisable to select the second optical radiator 902 so that it is configured to only emit optical radiation of wavelengths longer than or at most equal toa predefined cutoff wavelength. Said cutoff wavelength should be selected longer than wavelengths used to photopolymerize resins in stereolithography. Ultraviolet radiation is often used for photopolymerizing, so said cutoff wavelength could be in the range of visible light. Laser light is monochromatic, so if a laser source is used in the second optical radiator 902, the wavelength of the laser light is synonymous to said cutoff wavelength. Naturally the wavelength of the second optical radiator 902 must be selected so that its reflection is easily detectable by the optical imaging detector 501.

Figure 19:
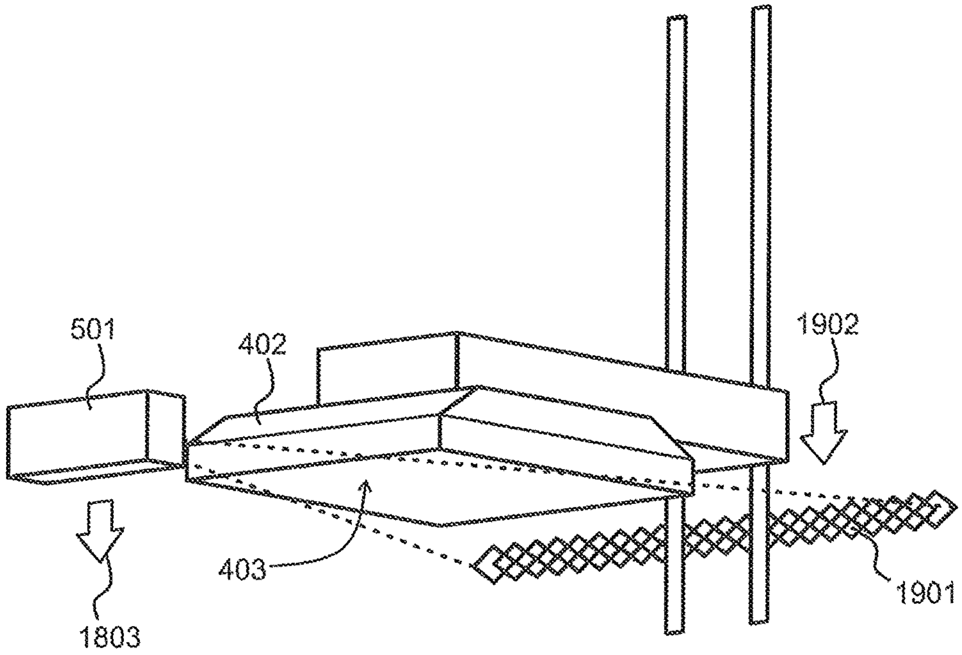
FIG. 19 illustrates an example of using an optical imaging detector to examine a build surface.

FIG. 19 illustrates an embodiment that can be used to examine the build surface for exceptions from its default form in place of or in addition to the embodiment described above. In the embodiment of FIG. 19 a pattern 1901 of some predetermined kind appears in the field of view of the optical imaging detector 501 at least when the optical imaging detector 501 is at one position. The location of the pattern 1901 has further been selected so that at some mutual positioning of the optical imaging detector 501 and the build platform 402 the latter partially covers the pattern 1901 in the field of view of the former. In particular, at said mutual positioning of the optical imaging detector 501 and the build platform 402, a view taken from the optical imaging detector 501 exactly along the build surface 403 intersects the pattern 1901.

If the build surface 403 is clean and planar, an image taken by the optical imaging detector 501 at said mutual positioning shows the pattern 1901 neatly cut along a straight line. The controller of the stereolithography apparatus may execute a machine vision process to examine, whether this is true or whether the part of the pattern 1901 visible in the image appears distorted in any way. Any distortion in the line that delimits the part of the pattern 1901 visible in the image indicates that some remnants of solidified resin may have been left on the build surface 403.

The mutual positioning of the optical imaging detector 501 and the build platform 402 that appears in FIG. 19 may be achieved for example during the movement when the build platform 402 moves down towards the starting position of stereolithographic 3D printing, as illustrated by arrow 1902 in FIG. 19. Another possibility to achieve said mutual positioning is when the optical imaging detector 501 moves downwards as illustrated by arrow 1903, as a part of a closing lid to which the optical imaging detector 501 is installed. Said mutual positioning can also be achieved by intentionally moving at least one of the build platform 402 or the optical imaging detector 501 for just this purpose and not as a part of a movement that principally serves some other purpose.

Figure 20:
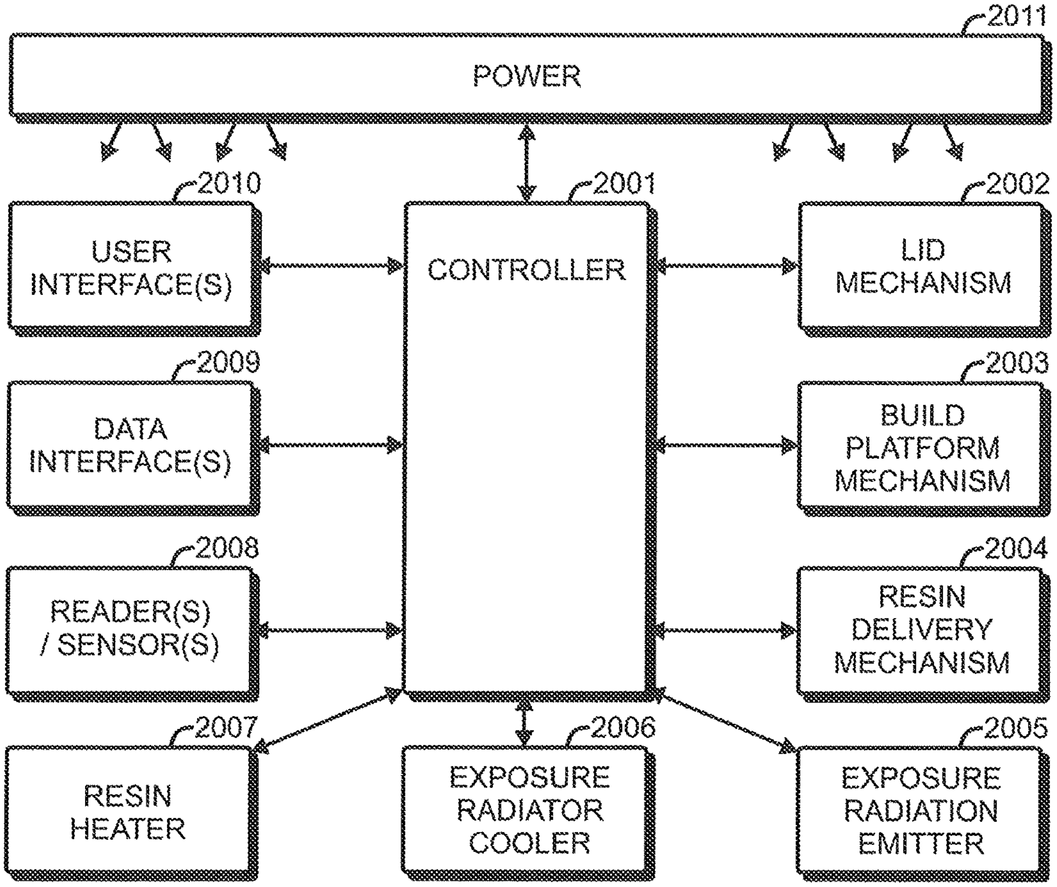
FIG. 20 illustrates an example of a block diagram of a stereolithography apparatus.

FIG. 20 is a schematic block diagram that illustrates some parts of an example of a stereolithography apparatus according to an embodiment.

A controller 2001 has a central role in the operation of the apparatus. Structurally and function-ally it may be based on one or more processors configured to execute machine-readable instructions stored in one or more memories that may comprise at least one of built-in memories or detachable memories.

A lid mechanism 2002 comprises the mechanical and electrical parts that serve the purpose of moving the lid that opens or closes the working region.

A build platform mechanism 2003 comprises the mechanical and electrical parts that serve the purpose of moving the build platform between its first and second extreme positions. The build platform mechanism 2003 may also comprise parts that serve to ensure correct angular positioning of the build platform.

A resin delivery mechanism 2004 comprises the mechanical and electrical parts that serve the purpose of pumping resin into the vat, and possibly draining unused resin from the vat back into some long-term repository.

An exposure radiation emitter part 2005 comprises the mechanical, electrical, and optical parts that serve the purpose of controllably emitting radiation that causes selective photopolymerization of resin during the stereolithographic 3D printing process.

An exposure radiator cooler part 2006 comprise the mechanical, electrical, and thermal parts that serve the purpose of maintaining the exposure radiation emitter part 2005 at its optimal operating temperature.

A resin heater part 2007 comprise the mechanical, electrical, and thermal parts that serve the purpose of pre-heating the resin into a suitable operating temperature and maintaining it there during the stereolithographic 3D printing process.

A reader(s) and/or sensor(s) block 2008 comprises all devices that can be classified as readers or sensors. For example all optical imaging detectors of the kind described earlier, as well as optical radiation emitters that serve other purposes than photopolymerizing resin during the stereolithographic 3D printing process belong to the reader(s) and/or sen-sor(s) block 2008.

The stereolithography apparatus may comprise a data interface 2009 for exchanging data with other devices. The data interface 2009 can be used for example to receive from some other device the 3D modelling data that describes, what kind of an object should be produced through stereolithographic 3D printing. The data interface 2009 can also be used to provide diag-nostic data about the operation of the stereolithography apparatus to other devices, such as a monitoring computer.

The stereolithography apparatus may comprise a user interface 2010 for exchanging information with one or more users. The user interface 2010 may comprise tangible, local user interface means for facilitating immediate interaction with a user next to the stereolithography apparatus. Additionally or alternatively the user interface 2010 may comprise software and communication means for facilitating remote operation of the stereolithography apparatus for example through a network or through an app installed on a separate user's device such as a smartphone or other personal wireless communications device.

The stereolithography apparatus may comprise a power block 2011 configured to convert operating power, such as AC from an electricity distribution network, into voltages and currents needed by the various parts of the apparatus and to safely and reliably deliver such voltages and currents to said parts of the apparatus.

Figure 21:
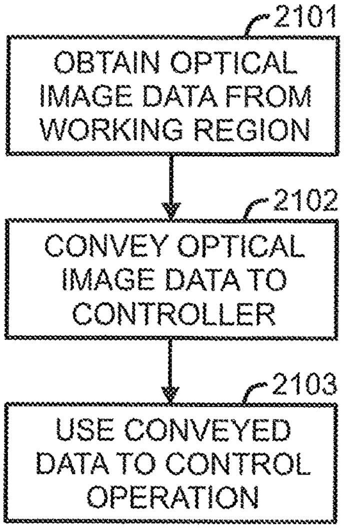
FIG. 21 illustrates an example of a method.

FIG. 21 illustrates schematically a method of operating a stereolithography apparatus. This embodiment of the method comprises using an optical imaging detector to obtain optical image data from at least apart of a working region of the stereolithography apparatus at step 2101. The method comprises conveying said optical image data to a controller of the stereolithography apparatus at step 2102, and using said optical image data in controlling operation of the stereolithography apparatus at step 2103.

Figure 22:
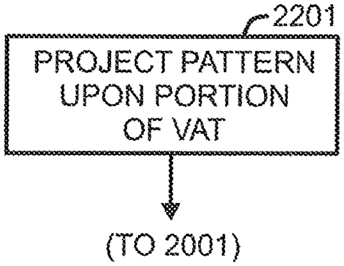
FIG. 22 illustrates an example of a method.

FIG. 22 illustrates how the method may comprise, as a step 2201 prior to step 2101, a step of optically projecting a first pattern upon a portion of a vat of said stereolithography apparatus. In this case the step 2101 illustrated in FIG. 21 may comprise generating a digital representation of an optical image of said portion of said vat or of a surface on which a reflection of said patternappears. Step 2103, on the other hand, may comprise calculating an amount of resin in said vat using said digital representation. The first pattern projected at step 2201 may be a spot-like pattern, or a distributed pattern of laser light that gets reflected by a portion of a rim of said vat. The first pattern may comprise a line across a portion of said rim, and the method may comprise detecting from said digital representation the length of a first reflected part of said line that optically appears different than the rest of said line. Additionally or alternatively the first pattern may comprise a spot in the middle part of the vat, and the method may comprise detecting from said digital representation the location of a secondary reflection that optically appears at a different location depending on the surface level of resin in the vat.

Figure 23:
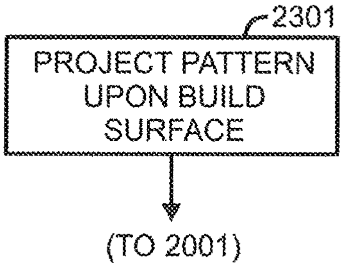
FIG. 23 illustrates an example of a method.

FIG. 23 illustrates how the method may comprise, as a step 2301 prior to step 2101, a step of optically projecting a second pattern upon a build surface of a build platform of said stereolithography apparatus. In this case the step 2101 illustrated in FIG. 21 may comprise generating a digital representation of an optical image of that portion of said build surface upon which the second pattern is projected. Step 2103, on the other hand, may comprise using said digital representation to examine said build surface for exceptions from a default form of said build surface. Said second pattern may comprises a line across said part of said build surface, and the method may comprise detecting from said digital representation any optically appearing irregularities of a reflection of said line. The method may further comprise comparing a representation of said second pattern found in said optical image to a default representation of said second pattern. The method may further comprise either allowing the operation of the stereolithography apparatus to continue as a response to finding said representation of said pattern to be the same as said default representation, or interrupting operation of the stereolithography apparatus as a response to finding said representation of said pattern to differ from said default representation.

Figure 24:
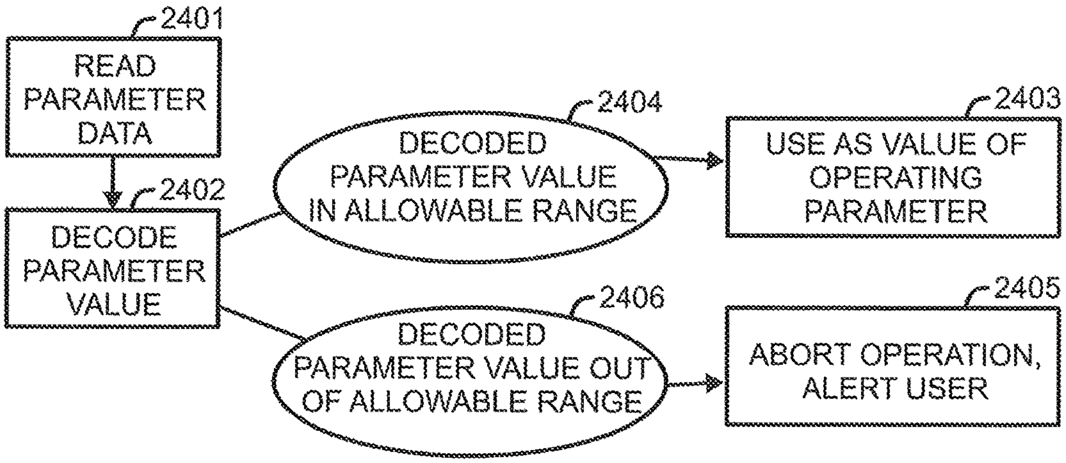
FIG. 24 illustrates an example of a method.

FIG. 24 illustrates schematically a method of operating a stereolithography apparatus. This embodiment of the method is particularly suited for enabling the controller of the stereolithography apparatus to acquire values for operating parameters so that they are optimal for the currently used resin, even in cases where the optimal operating parameter values for just that resin are not stored beforehand in any library of operating parameter values in the stereolithography apparatus itself.

The method of FIG. 24 comprises using a reader device to read in parameter data from a resin tank at step 2401. The reader device used in step 2401 may be an optical imaging detector, or it may be some other kind of reader device.

The method comprises also conveying the read-in parameter data to a controller of said stereolithography apparatus. Typically the read-in parameter data needs to be decoded at step 2402, for example so that a bit string that appeared in digital image data that the controller received from an optical imaging detector or other kind of reader device is converted into a numerical value according to a predetermined decoding method. The method comprises also using apiece of said conveyed parameter data as a value of an operating parameter of said stereolithography apparatus at step 2403.

The piece of conveyed parameter data may comprise—and may be used as—a preheating temperature of resin, a layer exposure time, a layer thickness, a moving speed of a build platform, and/or a waiting time between two successive method steps in stereolithographic 3D printing. Using the piece of conveyed parameter data for other purposes is not excluded.

The method may comprise comparing said piece of said conveyed parameter data to information indicative of an allowable range of parameter values. That kind of information may be previously stored in a memory of the stereolithography apparatus in order to ensure that it will not attempt operating with parameter values that are not safe or otherwise not recom-mendable. The method may comprise allowing the operation of the stereolithography apparatus to continue as a response to finding said piece of said conveyed parameter data to be within said allowable range of parameter values as illustrated with the reference designator 2404. The method may also comprise preventing or interrupting operation of the stereolithography apparatus according to step 2405, as a response to finding said piece of said conveyed parameter data to be out of said allowable range of parameter values as illustrated with the reference designator 2406.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. Stereolithography apparatus used for manufacturing an object, comprising:

a fixed vat or a holder for receiving a removable vat for holding resin for use in a stereolithographic 3D printing process, the fixed or removeable vat having a bottom, a build platform, and a moving mechanism coupled to the build platform to move the build platform in relation to the fixed or removable vat, a polymerizing radiator comprising a radiation emitter emitting radiation that polymerizes said resin in the vat during the stereolithographic 3D printing process, the polmerizing radiator providing the polymerizing radiation from below the fixed or removable vat, wherein the moving mechanism moves the build platform upwards away from the bottom of the fixed or removeable vat as manufacturing of the object proceeds, a projecting radiator comprising an optical radiator that does not polymerize said resin configured to project from above the fixed or removeable vat a pattern upon a portion of said fixed or removable vat, an optical imaging detector having a field of view, installed and directed so that said portion of said fixed or removable vat and/or a surface onto which the projected pattern is reflected is within said field of view when said optical imaging detector is in an operating position, and a controller coupled to said optical imaging detector for receiving optical image data from said optical imaging detector, wherein said controller is configured to use said optical image data to calculate an amount and/or surface level of resin in said fixed or removable vat.

2. A stereolithography apparatus according to claim 1, wherein said optical radiator is a laser configured to project at least one distributed pattern of laser light upon said portion of said fixed or removable vat.

3. A stereolithography apparatus according to claim 2, wherein said portion of said fixed or removable vat comprises a portion of a rim of said fixed or removable vat, and said laser is configured to project said at least one distributed pattern upon said rim so that it extends from an edge of said rim linearly towards a bottom of said fixed or removable vat.

4. A stereolithography apparatus according to claim 3, wherein said laser is configured to project said at least one distributed pattern upon said rim so that it extends from a horizontal edge of said rim perpendicularly towards said bottom of said fixed or removable vat.

5. A stereolithography apparatus according to claim 3, wherein said laser is configured to project said at least one distributed pattern upon said rim so that it extends from a horizontal edge of said rim obliquely towards said bottom of said fixed or removable vat.

6. A stereolithography apparatus according to claim 3, wherein said optical radiator is configured to project at least two separate distributed patterns of laser light upon said fixed or removable vat.

7. A stereolithography apparatus according to claim 2, wherein said laser comprises at least one laser source and at least one lens configured to distribute a linear laser beam produced by said laser source into a fan-like shape.

8. A stereolithography apparatus according to claim 1, wherein said optical radiator is a laser configured to project at least one pattern upon a center portion of said fixed or removable vat.

9. A stereolithography apparatus according to claim 1, wherein said optical radiator is configured to only emit optical radiation of wavelengths longer than or at most equal to a predefined cutoff wavelength that is longer than wavelengths used to photopolymerize resins in stereolithography.

10. A stereolithography apparatus according to claim 1, wherein said controller is configured to recognize an image of a reflection of said projected pattern from said optical image data and configured to calculate said amount and/or surface level of resin held in said vat from one or more detected dimensions of said image of said reflection.

11. A method of operating the stereolithography apparatus of claim 1, comprising:

optically projecting a pattern upon a portion of a fixed or removable vat of said stereolithography apparatus, generating a digital representation of an optical image of said portion of said fixed or removable vat and/or of a surface onto which the projected pattern is reflected with said pattern projected or reflected upon it, and calculating an amount and/or surface level of resin in said fixed or removable vat using said digital representation.

12. A method according to claim 11, wherein said pattern is a distributed pattern of laser light upon a portion of a rim of said fixed or removable vat.

13. A method according to claim 12, wherein said distributed pattern comprises a line across a portion of said rim, and the method comprises detecting from said digital representation the length of a first part of said line that optically appears different than the rest of said line.

14. A method according to claim 11, wherein said pattern is a pattern of laser light upon a center portion of the fixed or removable vat, and the method comprises detecting from said digital representation the location of a secondary reflection that optically appears at a different location depending on the surface level of resin in the fixed or removable vat.

15. Stereolithography apparatus, comprising:

a fixed vat or a holder for receiving a removable vat for holding resin for use in a stereolithographic 3D printing process, an optical radiator configured to project a pattern upon a portion of said fixed or removable vat, an optical imaging detector having a field of view, installed and directed so that said portion of said fixed or removable vat and/or a surface onto which the projected pattern is reflected is within said field of view when said optical imaging detector is in an operating position, and a controller coupled to said optical imaging detector for receiving optical image data from said optical imaging detector, wherein said controller is configured to use said optical image data to calculate an amount and/or surface level of resin in said fixed or removable vat, and wherein said optical radiator is a laser configured to project at least one distributed pattern of laser light upon a portion of said vat, said portion comprising a portion of a rim of said vat and said laser being configured to project said at least one distributed pattern upon said rim so that it extends from an edge of said rim linearly towards a bottom of said fixed or removable vat.

16. A stereolithography apparatus according to claim 15, wherein said laser is configured to project said at least one distributed pattern upon said rim so that it extends from a horizontal edge of said rim perpendicularly towards said bottom of said vat.

17. A stereolithography apparatus according to claim 15, wherein said laser is configured to project said at least one distributed pattern upon said rim so that it extends from a horizontal edge of said rim obliquely towards said bottom of said vat.

18. A stereolithography apparatus according to claim 15, wherein said optical radiator is configured to project at least two separate distributed patterns of laser light upon said vat.

19. Stereolithography apparatus, comprising:

a fixed vat or a holder for receiving a removable vat for holding resin for use in a stereolithographic 3D printing process, a radiation emitter emitting radiation that polymerizes said resin in the vat during the stereolithographic 3D printing process, an optical radiator that does not polymerize said resin configured to project a pattern upon a portion of said fixed or removable vat, an optical imaging detector having a field of view, installed and directed so that said portion of said fixed or removable vat and/or a surface onto which the projected pattern is reflected is within said field of view when said optical imaging detector is in an operating position, and a controller coupled to said optical imaging detector for receiving optical image data from said optical imaging detector, wherein said controller is configured to use said optical image data to calculate an amount and/or surface level of resin in said fixed or removable vat, wherein said optical radiator is a laser configured to project at least one distributed pattern of laser light upon said portion of said fixed or removable vat, said portion of said fixed or removable vat comprises a portion of a rim of said fixed or removable vat, and said laser is configured to project said at least one distributed pattern upon said rim so that it extends from an edge of said rim linearly towards a bottom of said fixed or removable vat, and said optical radiator is configured to project at least two separate distributed patterns of laser light upon said fixed or removable vat.

20. The stereolithography apparatus according to claim 19 wherein the radiation emitter is emitting from below the fixed or removable vat.

* * * * *